US011438404B2

(12) United States Patent
Lovegrove

(10) Patent No.: US 11,438,404 B2
(45) Date of Patent: Sep. 6, 2022

(54) EDGE COMPUTING DEVICE FOR CONTROLLING ELECTROMECHANICAL SYSTEM WITH LOCAL AND REMOTE TASK DISTRIBUTION CONTROL

(71) Applicant: Morphix, Inc., Vancouver, WA (US)

(72) Inventor: Jonathan Lovegrove, Yacolt, WA (US)

(73) Assignee: MORPHIX, INC., Vancouver, WA (US)

( * ) Notice: Subject to any disclaimer, the term of this patent is extended or adjusted under 35 U.S.C. 154(b) by 45 days.

(21) Appl. No.: 17/077,976

(22) Filed: Oct. 22, 2020

(65) Prior Publication Data

US 2022/0131925 A1    Apr. 28, 2022

(51) Int. Cl.
*G16Y 30/00* (2020.01)
*G16Y 40/35* (2020.01)
*G06N 3/04* (2006.01)
*G06N 3/08* (2006.01)
*H04L 67/025* (2022.01)

(52) U.S. Cl.
CPC ......... *H04L 67/025* (2013.01); *G06N 3/0454* (2013.01); *G06N 3/08* (2013.01); *G16Y 30/00* (2020.01); *G16Y 40/35* (2020.01)

(58) Field of Classification Search
CPC ...... H04L 67/025; G06N 3/0454; G06N 3/08; G16Y 30/00; G16Y 40/35
See application file for complete search history.

(56) References Cited

U.S. PATENT DOCUMENTS

2020/0233397 A1* 7/2020 Bello ................ G06N 20/20
2021/0117865 A1* 4/2021 Chew ................ H04L 41/16

* cited by examiner

*Primary Examiner* — Shirley X Zhang
(74) *Attorney, Agent, or Firm* — Alleman Hall Creasman & Tuttle LLP

(57) ABSTRACT

A computing device, including a processor configured to receive sensor data from a control device. The control device may include a control processor configured to execute control instructions to control an actuator of a target electromechanical system and may further include one or more sensors. The processor may identify a first subset of the sensor data and a second subset of the sensor data. The processor may generate first control instructions based on the first subset and transmit the first control instructions to the control processor of the control device. The processor may transmit the second subset to a remote computing device. In response to transmitting the second subset to the remote computing device, the processor may receive a remote processing result from the remote computing device. The processor may generate second control instructions from the remote processing result and transmit the second control instructions to the control processor.

20 Claims, 12 Drawing Sheets

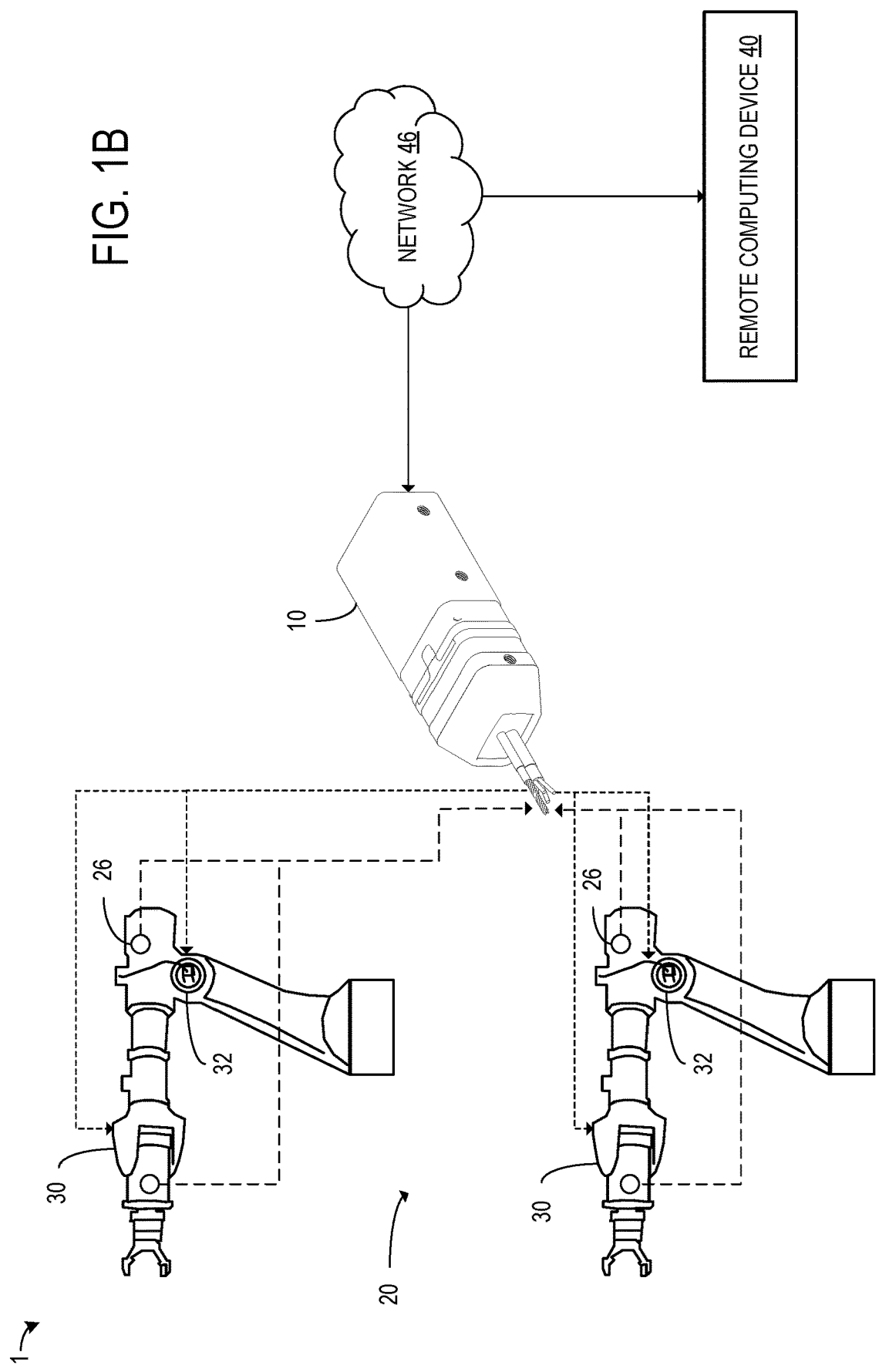

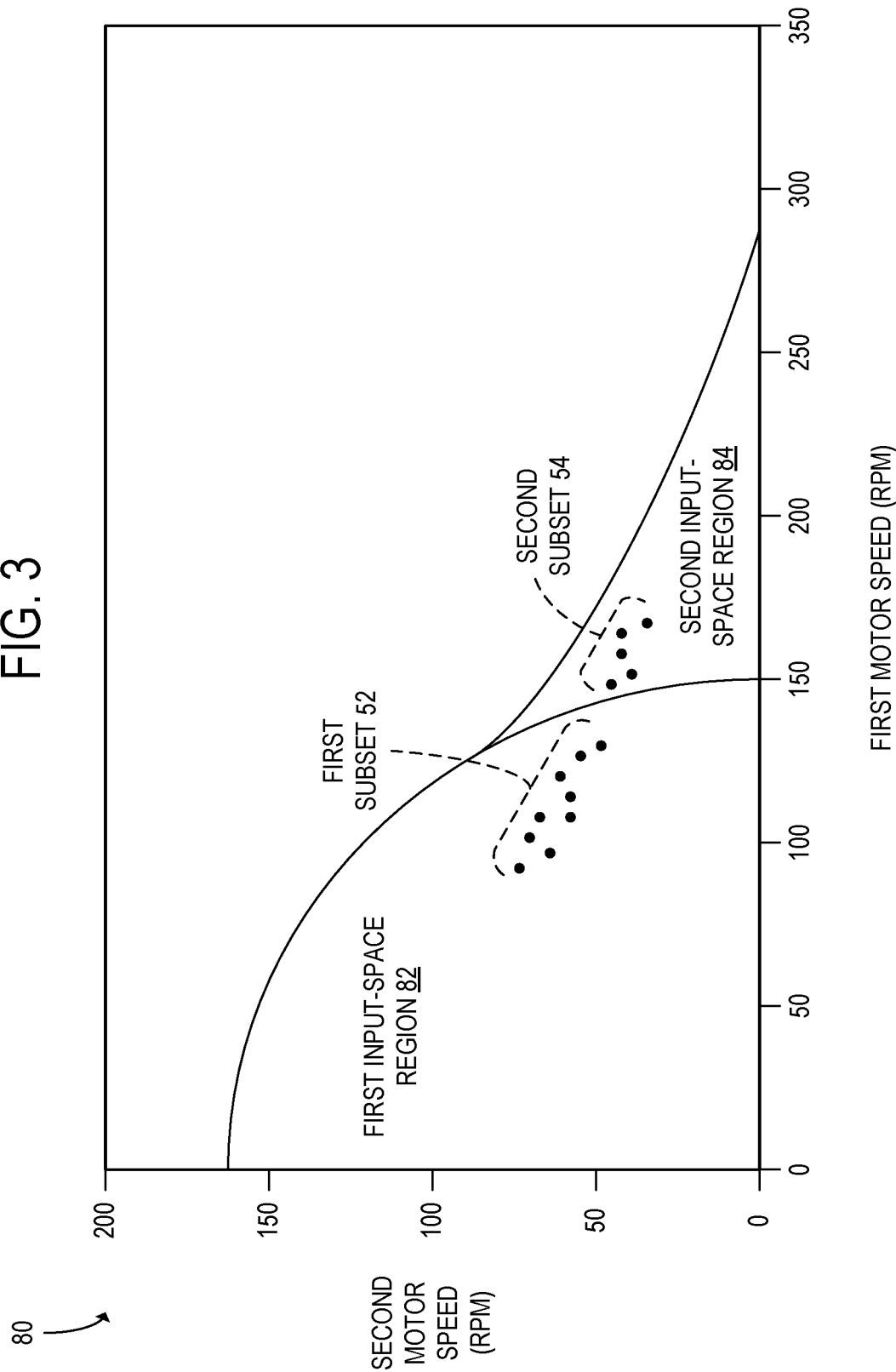

EDGE COMPUTING DEVICE FOR CONTROLLING ELECTROMECHANICAL SYSTEM WITH LOCAL AND REMOTE TASK DISTRIBUTION CONTROL

BACKGROUND

Internet of Things (IoT) connected devices have recently come to be used in a wide variety of settings, such as manufacturing, transportation, resource extraction, climate control for buildings, and biometrics. These IoT connected devices may include sensors with which the IoT connected devices collect data related to the physical environments in which they are located. In addition, IoT connected devices may include controllable devices that are configured to perform physical actions in response to receiving control signals. The IoT connected device may be configured to communicate with a programmable logic controller (PLC), which may be configured to communicate with an edge computing device. The edge computing device may be configured to communicate with a remotely located server computing device, which may provide cloud computing resources to the edge computing device.

SUMMARY

According to one aspect of the present disclosure, a computing device is provided, including a processor configured to receive sensor data from a control device. The control device may include a control processor configured to execute control instructions to control an actuator of a target electromechanical system. The control device may further include one or more sensors configured to collect the sensor data from a physical environment in which the target electromechanical system is situated. The processor may be further configured to identify a first subset of the sensor data to be processed locally and a second subset of the sensor data to be processed remotely. The processor may be further configured to generate first control instructions based on the first subset of the sensor data. The processor may be further configured to transmit the first control instructions to the control processor of the control device. The processor may be further configured to transmit the second subset of the sensor data to a remote computing device. In response to transmitting the second subset of the sensor data to the remote computing device, the processor may be further configured to receive a remote processing result from the remote computing device. The processor may be further configured to generate second control instructions from the remote processing result and transmit the second control instructions to the control processor of the control device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1B shows the computing device of FIG. 1A in an example in which the computing device is configured to control a plurality of robotic devices.

FIG. 3 shows an example parameter space diagram for sensor inputs, according to the embodiment of FIG. 1A.

DETAILED DESCRIPTION

In the conventional IoT system discussed above, in which an IoT controlled device is controlled using a PLC that communicates with an edge computing device, communication latency between the PLC and the edge computing device may interfere with the operation of IoT controlled device. This latency may result in a low temporal resolution for signals transmitted to and from the IoT controlled device and may limit what types of control schemes may be used. Limitations on the bandwidth of communications between the PLC and the edge computing device may further limit the resolution of the data received from sensors and the control schemes that may be used in the control signals sent to controllable devices.

Figure 1A:
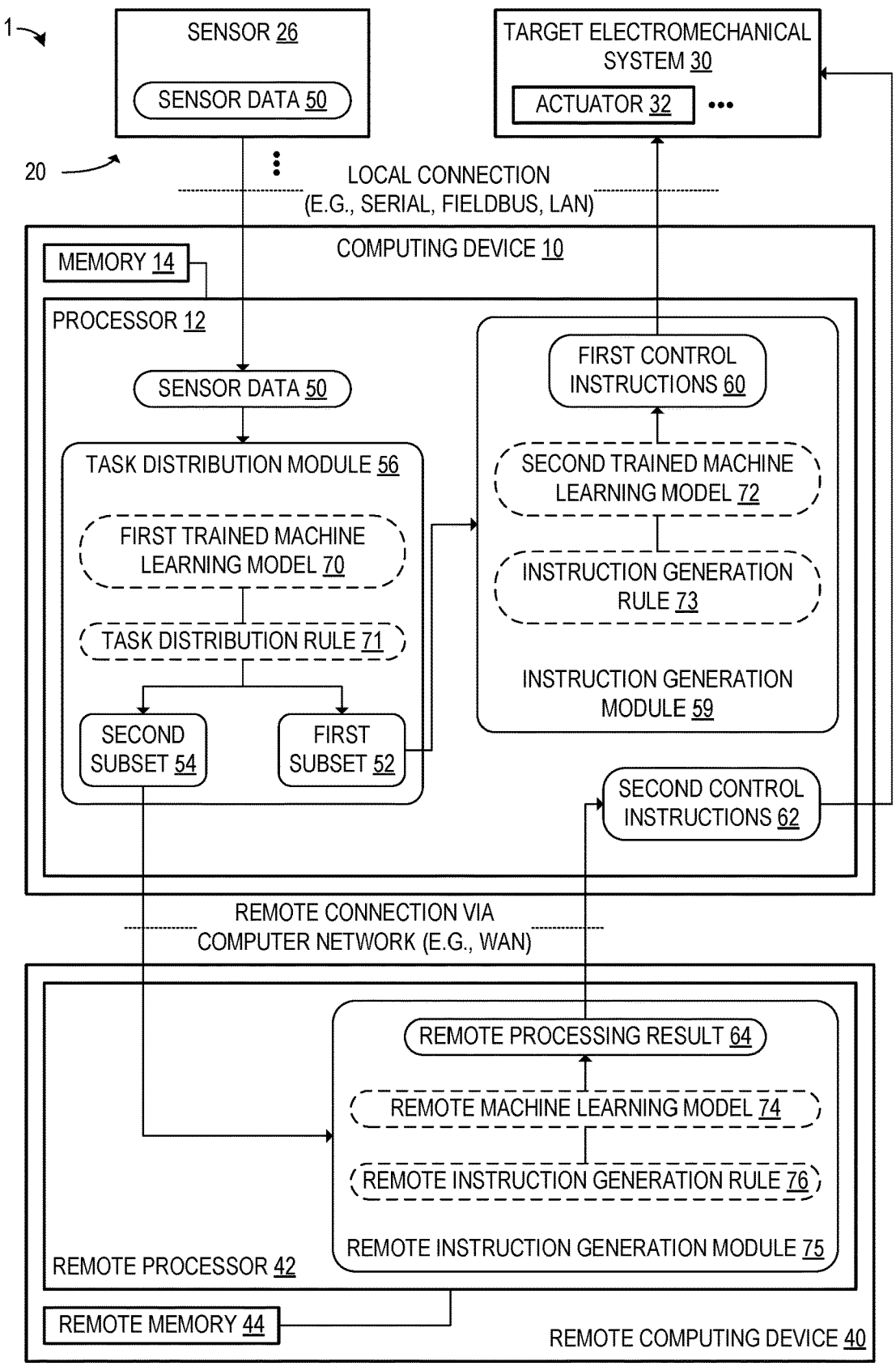
FIG. 1A schematically shows a computing system including a computing device connected to a remote computing device such as a server via a remote connection over a computer network such as a wide area network, and also connected to one or more sensors and a target electromechanical system via a local connection such as a serial, fieldbus, or LAN connection, according to one example embodiment.

In order to address the above shortcomings of conventional IoT systems, a computing system 1 including a computing device 10 is provided, as schematically shown in the example of FIG. 1A. The computing device 10 of FIG. 1A may include a processor 12. In addition, the computing device 10 may include memory 14, which may include volatile memory and non-volatile memory. The computing device 10 may be configured to transmit control instructions to a target electromechanical system 30. The computing device 10 may be located proximate to the target electromechanical system 30 in the physical environment and may communicate with the target electromechanical system 30 via a wired or wireless local connection. The wired or wireless local connection is typically a serial connection (e.g., universal serial bus (USB), RS-232), fieldbus connection (e.g., GPIB, MAP, MMS, MODBUS, PROFIBUS, INTERBUS, CAN, etc.), local area network (LAN) connection (e.g., wired LAN over Ethernet/IP or wireless LAN), or other suitable local connection that does not include a high latency computer network such as a wide area network (WAN). The target electromechanical system may include, to name a few examples, a robot, HVAC system, alarm system, plumbing system, conveyor system, manufacturing applicator, or other controlled system. These examples are not to be considered limiting as numerous other examples are possible. The computing device 10 may be referred to as an edge computing device due to its position on the network topology having a local connection to the target electromechanical system 30 and a remote connection to a remote computing device 40, described below.

The processor 12 of the computing device 10 may be configured to execute control instructions to control one or more actuators 32 included in the target electromechanical system 30. The one or more actuators 32 may be one or more components of the target electromechanical system 30 that are configured to move when they receive electrical signals. For example, the one or more actuators 32 may include one or more motors, one or more speakers, one or more electrically controllable switches, or one or more other types of actuators. One or more controllable components other than actuators, such as one or more heating coils, lights, cameras, conveyors, valves, etc., may be included in the target electromechanical system 30 in some examples.

The processor 12 may be further configured to receive sensor data 50 from one or more sensors 26 configured to collect the sensor data 50 from a physical environment 20 in which the target electromechanical system 30 is situated. Although the one or more sensors 26 are shown in FIG. 1A as being provided separately from the target electromechanical system 30, the one or more sensors 26 may be integrated into the target electromechanical system 30 in other examples. The one or more sensors 26 may, for example, include one or more cameras, one or more temperature sensors, one or more accelerometers, one or more pressure sensors, one or more microphones, one or more magnetic field sensors, or one or more other types of sensors. The processor 12 may be configured to receive the sensor data 50 via a local connection selected from the group consisting of a serial connection, a fieldbus, and a local area network.

Subsequently to receiving the sensor data 50 from the one or more sensors 26, the processor 12 may be further configured to identify a first subset 52 of the sensor data 50 to be processed locally and a second subset 54 of the sensor data 50 to be processed remotely. As discussed in further detail below, the second subset 54 may be transmitted to a remote computing device 40. In some examples, the first subset 52 and the second subset 54 may overlap, whereas in other examples, the first subset 52 and the second subset 54 may be disjoint.

FIG. 1B shows the computing device 10 in an example in which the computing device 10 is used with two target electromechanical systems 30 in the form of two robotic arms. In the example of FIG. 1B, each of the target electromechanical systems 30 includes two actuators 32 configured to receive control instructions from the computing device 10. The actuators 32 in the example of FIG. 1B are each motor configured to move joints of the robotic arms. In addition, each of the robotic arms includes two sensors 26 that are configured to transmit sensor data 50 to the computing device 10. For example, the sensors 26 included in each of the robotic arms may be accelerometers. The computing device 10 in the example of FIG. 1B is configured to communicate with the remote computing device 40 over a network 46.

The processor 12 of the computing device 10 may be configured to execute a task distribution module 56 configured to perform local and remote task distribution control, by identifying tasks or data associated with tasks that are to be processed locally at computing device 10 or remotely at remote computing device 40. Thus, the task distribution control model 56 is configured to identify the first subset 52 (processed locally) and the second subset 54 (processed remotely) of the sensor data 50. The task distribution module 56 may include a first trained machine learning model 70. Additionally or alternatively, the task distribution module 56 may include one or more task distribution rules 71 that may be applied to the sensor data 50 to sort the sensor data 50 into the first subset 52 and the second subset 54.

Figure 2:
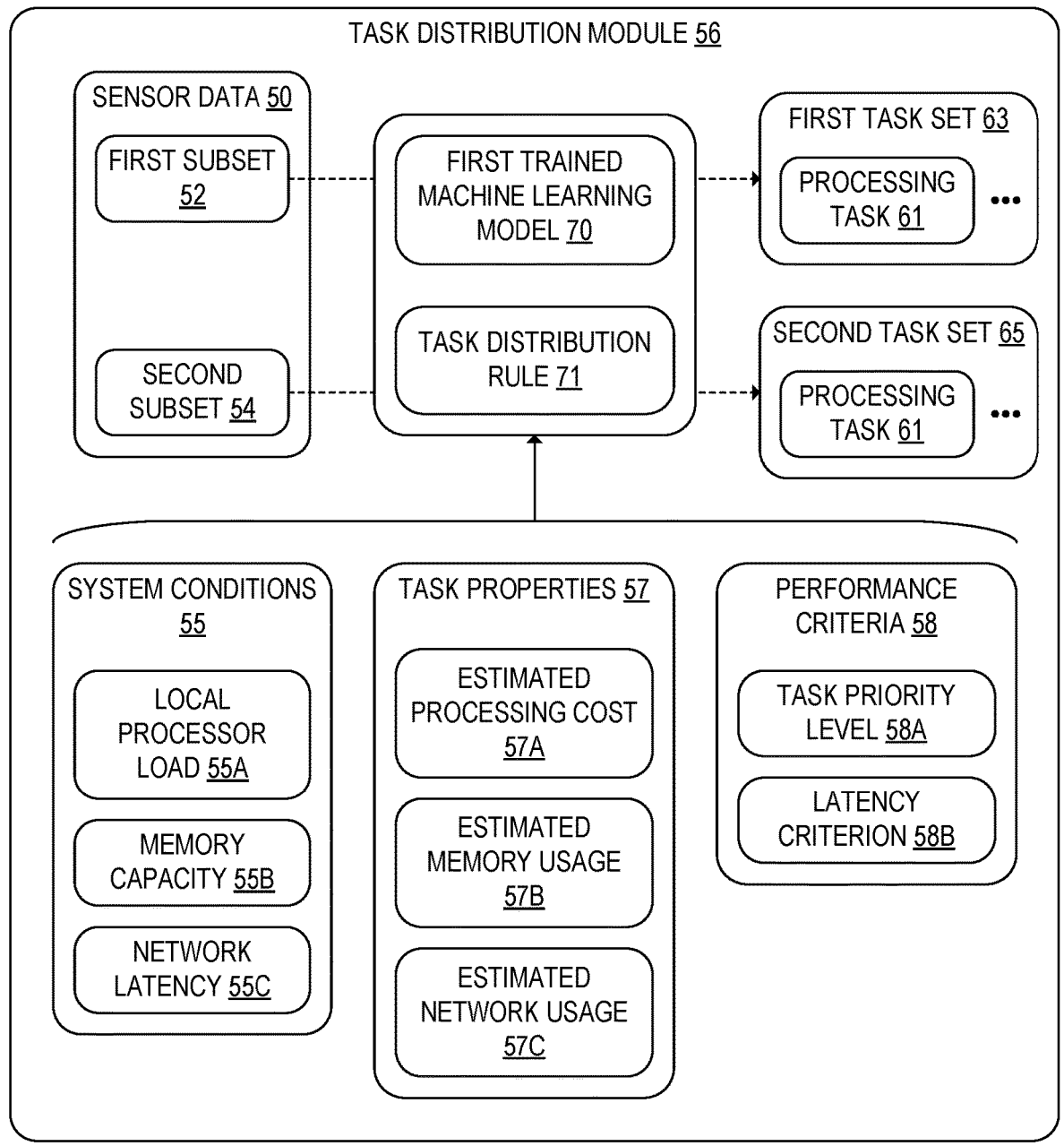
FIG. 2 shows the task distribution module executed by the processor of the computing device in additional detail, according to the embodiment of FIG. 1A.

FIG. 2 shows the task distribution model 56 in additional detail. As shown in FIG. 2, when the processor 12 executes the task distribution model 56, the processor 12 may be further configured to identify a first task set 63 including one or more processing tasks 61 that are configured to be performed on the first subset 52 of the sensor data 50 and a second task set 65 including one or more processing tasks 61 that are configured to be performed on the second subset 54 of the sensor data 50. When the processor 12 transmits the second subset 54 of the sensor data 50 to the remote processing device 40, the processor 12 may be further configured to transmit an indication of the second processing set 65 to the remote processing device 40. Alternatively, the one or more processing tasks 61 included in the second processing set 65 may be identified at the remote computing device 40.

The processor 12 may be configured to sort the sensor data 50 into the first subset 52 and the second subset 54 based at least in part on one or more system conditions 55, one or more task properties 57, or one or more performance criteria 58. The one or more system conditions 55 are properties of the computing device 10 that may affect computing performance. For example, the one or more system conditions 55 may include a local processor load 55A of the processor 12, a memory capacity 55B of the memory 14, or a network latency 55C of a network connection between the computing device 10 and the remote computing device 40. The one or more task properties 57 may be properties of the one or more processing tasks 61 included in the first task set 63 or the second task set 65. For example, the one or more task properties 57 may include one or more of an estimated processing cost 57A, an estimated memory usage 57B, and an estimated network usage 57C. The one or more task properties 57 may be indicated for one or more processing tasks 61 included in the first task set 63 or the second task set 65. The one or more performance criteria 58 may, for example, include one or more respective task priority levels 58A for the one or more processing tasks 61. The one or more performance criteria 58 may additionally or alternatively include one or more latency criteria 58B, which may indicate one or more maximum allowed network latencies for the one or more processing tasks 61. Additionally or alternatively to the system conditions 55, task properties 57, and performance criteria 58 provided in the above examples, other conditions or settings may be used as inputs by the task distribution module 56 when determining the first subset 52 and the second subset 54 of the sensor data 50.

In some examples, as discussed above, the processor 12 may be configured to identify the first subset 52 of the sensor data 50 and the second subset 54 of the sensor data 50 at least in part at a first trained machine learning model 70. For example, the first trained machine learning model 70 may be a recurrent neural network. The first trained machine learning model 70 may be configured to receive one or more values of the sensor data 50 as input, and may be configured to output one or more respective classifications for the one or more input values that classify the one or more input values as being included in the first subset 52 or the second subset 54.

In some examples, as shown in the example parameter space diagram 80 of FIG. 3, the processor 12 may be configured to identify the first subset 52 of the sensor data 50 at least in part by determining that the sensor data 50 included in the first subset 52 is within a first input-space region 82. The first input-space region 82 is a region of a parameter space defined by the variables of the sensor data 50 received from the one or more sensors 26. The parameter space may have a respective dimension for each dimension of the sensor data 50. In the example of FIG. 3, the variables of the sensor data 50 are a first motor speed and a second motor speed, which may, for example, be measured via imaging with one or more cameras. The processor 12 may be further configured to identify the second subset 54 of the sensor data 50 at least in part by determining that the sensor data 50 included in the second subset 54 is outside the first input-space region 82. In the example parameter space diagram of FIG. 3, the second subset 54 of the sensor data 50 is instead located within a second input-space region 84. The first input-space region 82 may, for example, be a region of parameter space values that indicate that the target electromechanical system 30 is operating within a normal operating mode. In such examples, when the processor 12 identifies sensor data 50 located outside the first input-space region 82, that sensor data 50 may indicate that the target electromechanical system 30 is operating under atypical conditions. Although the parameter space shown in the parameter space diagram 80 of FIG. 3 is a space with two variables, the parameter space may alternatively have some other number of variables.

Figure 4A:
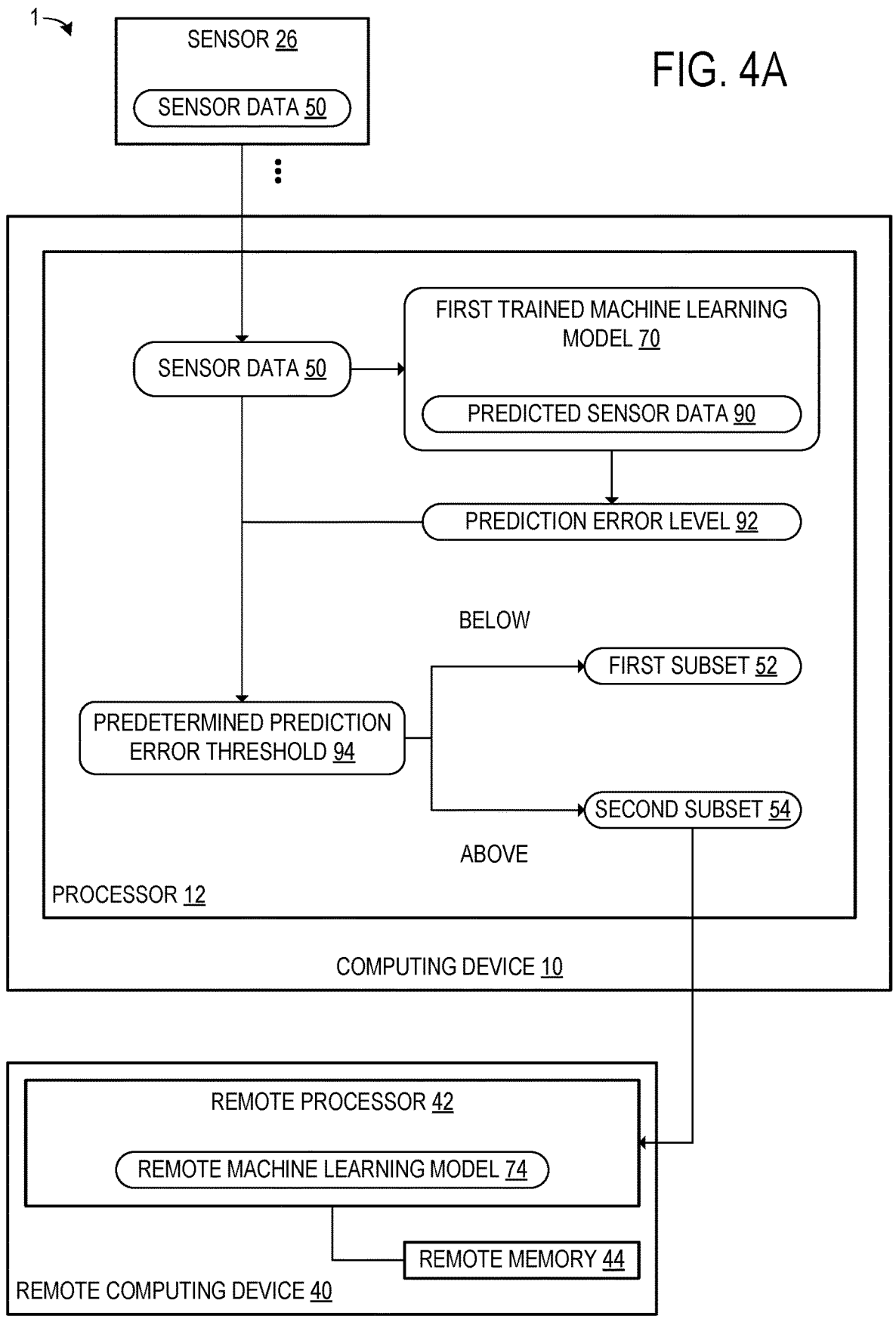
FIG. 4A schematically shows the computing device when a predictive processing model is executed, according to the embodiment of FIG. 1A.
Figure 4B:
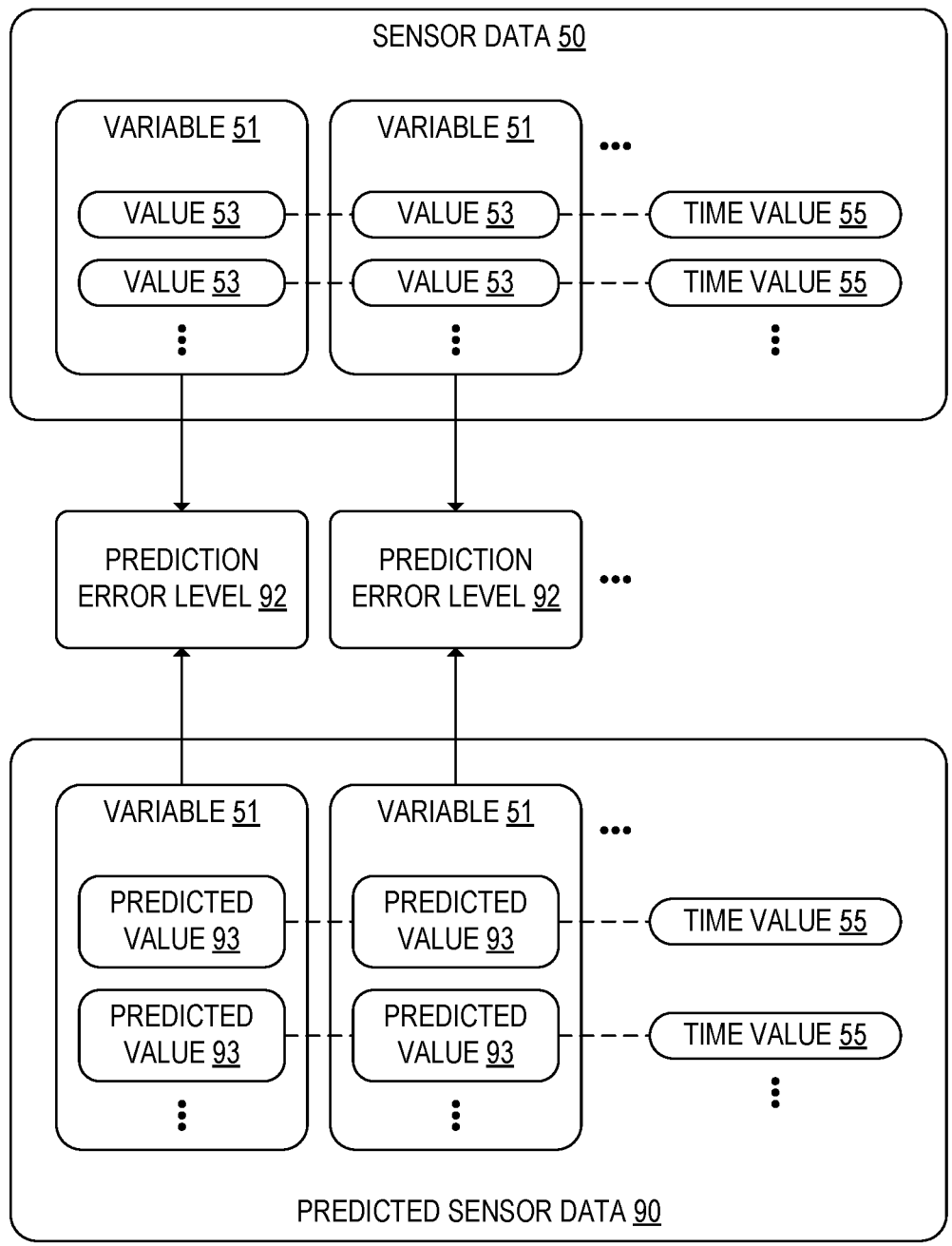
FIG. 4B shows sensor data and predicted sensor data when the predictive processing model of FIG. 4A is executed.

In some examples in which the first subset 52 and the second subset 54 are identified at a first trained machine learning model 70, the first trained machine learning model 70 may be a predictive processing model, as shown in the example of FIGS. 4A-4B. FIG. 4A schematically shows the computing device 10 when a predictive processing model is executed. As depicted in FIG. 4A, the processor 12 may be configured to generate predicted sensor data 90 at the first trained machine learning model 70. The sensor data 50 and the predicted sensor data 90 are shown in additional detail in FIG. 4B. As shown in FIG. 4B, the sensor data 50 may include respective values 53 for each of one or more variables 51. Each of those values 53 may be associated with a respective time value 55 at which that value 53 was measured. The predicted sensor data 90 may include one or more predicted values 93 of the sensor data 50. The one or more predicted values 93 may be associated with one or more time values 55 at which the one or more respective values 53 of the one or more variables 51 included in the sensor data 50 are predicted to match those predicted values 93. When sensor data 50 is received for those one or more time values 55, the processor 12 may be further configured to determine a prediction error level 92 for the predicted sensor data 90 relative to the sensor data 50 received from the one or more sensors 26 at that time value 55. For example, the prediction error level 92 may be a mean squared error for the one or more predicted values 93 of the predicted sensor data 90. In some examples, the processor 12 may be configured to determine the prediction error level 92 for a time interval including a plurality of time values 55.

Returning to FIG. 4A, the processor 12 may be further configured to identify, as the first subset 52, sensor data 50 below a predetermined prediction error threshold 94, and identify, as the second subset 54, sensor data 50 above the predetermined prediction error threshold 94. Thus, sensor data 50 that is accurately predicted by the first trained machine learning model 70 may be processed locally, while sensor data 50 that exhibits high levels of prediction error may be transmitted to the remote computing device 40 for processing.

In some examples, when the sensor data 50 and the predicted sensor data 90 each have a dimensionality of two (as one particular example) or greater, the processor 12 may be configured to compute respective prediction error levels 92 for one or more subsets of the plurality of variables 51. For example, the processor 12 may be configured to compute respective prediction error levels 92 for each of the measured variables 51 individually, or for one or more subsets of the plurality of variables 51 that include two or more variables 51. The processor 12 may be further configured to compare the prediction error levels 92 for each of those subsets of the plurality of variables 51 to a respective predetermined prediction error threshold 94. For each subset of the plurality of variables that exceeds its corresponding predetermined prediction error threshold 94, the one or more variables in that subset may be transmitted to the remote computing device 40. The other variables 51 of the plurality of variables 51 may be processed locally.

In examples in which the first subset 52 of the sensor data 50 and the second subset 54 of the sensor data 50 are selected at a first trained machine learning model 70, the processor 12 may be further configured to further train the first trained machine learning model 70 based on the sensor data 50. In examples in which the processor 12 is configured to generate predicted sensor data 90 at the first trained machine learning model 70, the processor 12 may be further configured to modify the first trained machine learning model 70 when sensor data 50 is received. Such a modification may be made based on the prediction error level 92 for that sensor data 50. For example, when the first trained machine learning model is configured to generate predicted sensor data 90, the first trained machine learning model may be initially trained via unsupervised learning using a set of training sensor data and may be further updated via unsupervised learning using the sensor data 50.

Returning to FIG. 1A, the processor 12 may be further configured to generate first control instructions 60 based on the first subset 52 of the sensor data 50. Subsequently to generating the first control instructions 60, the processor 12 may be further configured to execute the first control instructions 60 to control the one or more actuators 32 of the target electromechanical system 30. The first control instructions 60 may be instructions to perform one or more control operations at the one or more actuators 32 included in the target electromechanical system 30. The first control instructions 60 may, for example, be an instruction to start, stop, or change the direction of a motor; to open or close an electromechanical switch; to play a sound on a speaker; or perform some other operation at the one or more actuators 32 of the target electromechanical system 30. These examples are to be considered illustrative and not limiting as numerous functions are possible.

Figure 5:
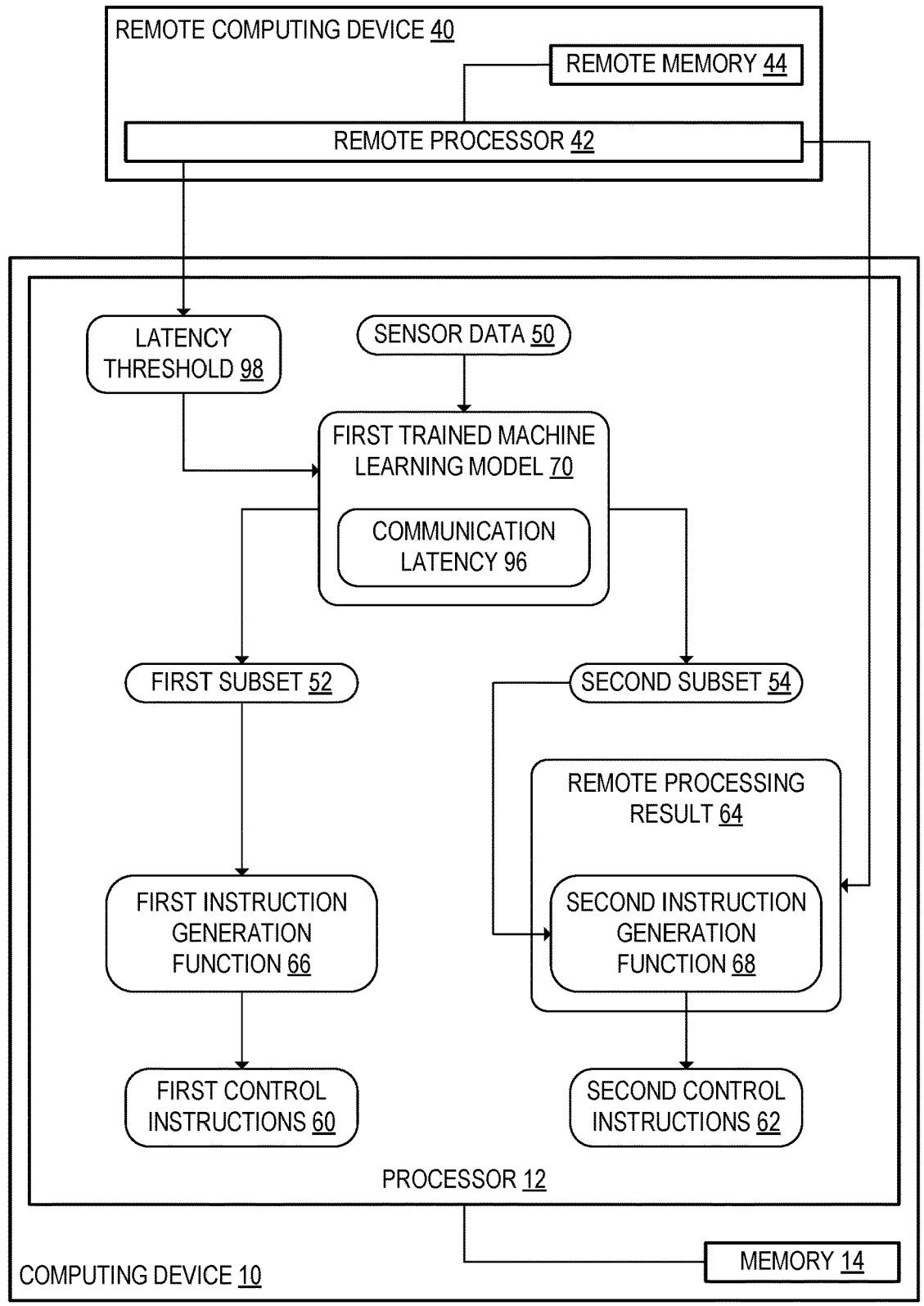
FIG. 5 schematically shows the computing device and the remote computing device when the remote processing result received at the computing device includes a second instruction generation function, according to the embodiment of FIG. 1A.

The first control instructions 60 may be generated at an instruction generation module 59, which may include a second trained machine learning model 72. Additionally or alternatively, the instruction generation module 59 may include one or more instruction generation rules 73. As shown in the example of FIG. 5, the processor 12 may be configured to apply a first instruction generation function 66 to the first subset of the sensor data 50 to compute the first control instructions 60. In examples in which the processor 12 is configured to generate the first control instructions 60 at least in part at a second trained machine learning model 72, the second trained machine learning model 72 may, for example, be a recurrent neural network.

The processor 12 may be further configured to transmit the second subset 54 of the sensor data 50 to a remote computing device 40. For example, the processor 12 may be configured to transmit the second subset 54 of the sensor data 50 to the remote computing device 40 via a wide area network (WAN). The remote computing device 40 may include a remote processor 42 and remote memory 44. The functionality of the remote computing device 40 may be distributed between a plurality of remote computing devices 40 configured to communicate with each other. In some examples, the remote computing device 40 may be a server computing device located in a data center.

In response to transmitting the second subset 54 of the sensor data 50 to the remote computing device 40, the processor 12 may be further configured to receive a remote processing result 64 from the remote computing device 40. The processor 12 may be further configured to generate second control instructions 62 from the remote processing result 64 and execute the second control instructions 62 to control the one or more actuators 32 of the target electromechanical system 30. Alternatively, the processor 12 may be configured to receive the second control instructions 62 from the remote computing device 40 as the remote processing result 64.

In some examples, the remote processing result 64 may include additional sensor data received at the remote computing device 40 via one or more other computing devices. The one or more other computing devices may be connected to one or more additional sensors located in the physical environment 20. In such examples, the second control instructions 62 may be generated based on the additional sensor data. Thus, the additional sensor data may be used as contextual sensor data that provides the processor 12 with additional information about the physical environment 20 in which is it located. The additional sensor data may, for example, indicate that a temperature measured by an additional sensor connected to another computing device is close to the top of a safe operating temperature range. In response to receiving a remote processing result 64 that includes the temperature measurement, the processor 12 may be configured to generate and execute second control instructions 62 to turn on a fan.

In some examples, the remote processing result 64 may include an indication of the second input-space region 84 within which the sensor data 50 included in the second subset 54 is located. The remote processing result 64 may further include, as shown in FIG. 5, a second instruction generation function 68 that maps one or more sensor data values 53 located within the second input-space region 84 to one or more respective control instructions. In such examples, the processor 12 may be further configured to generate the second control instructions 62 at least in part by applying the second instruction generation function 68 to the second subset 54 of the sensor data 50. The processor 12 may be further configured to store the second instruction generation function 68 in the memory 14. Thus, as the processor 12 receives sensor data 50 located within new regions of the parameter space, the area of the parameter space for which control instructions are generated without offloading processing to the remote computing device 40 may expand.

Additionally or alternatively to including a second instruction generation function 68, the remote processing result 64 may include a modification to the first instruction generation function 66 with which the processor is configured to generate the first control instructions 60. For example, when the first instruction generation function is a second trained machine learning model 72, the modification to the first instruction generation function 66 may be additional training performed at the second trained machine learning model 72.

The remote computing device 40 may be configured to generate the remote processing result 64 at a remote instruction generation module 75, as shown in the example of FIG. 1A. The remote instruction generation module 75 may include a remote machine learning model 76. Additionally or alternatively, the remote instruction generation module 75 may include one or more remote instruction generation rules 76. The sensor data 50 included in the second subset 54 may be used as input for the remote machine learning model 74 or the one or more remote instruction generation rules 76 included in the remote instruction generation module 75. The remote machine learning model 74 or the one or more remote instruction generation rules 76 may additionally take as input the additional sensor data received from the one or more other computing devices. In examples in which the first trained machine learning model 70 is a predictive processing model, as shown in the example of FIG. 4A, the remote machine learning model 74 may be further configured to receive the prediction error level 92 for the predicted sensor data 90. In other examples, the remote machine learning model 74 may be a version of the second trained machine learning model 72 with additional training and/or additional model parameters.

In some examples, the processor 12 may be configured to generate the first control instructions 60 based on the first subset 52 of the sensor data 50 in real time as the first subset 52 is received. The processor 12 may be further configured to transmit the second subset 54 of the sensor data 50 to the remote computing device 40 for non-real-time processing. Thus, real-time control of the one or more actuators 32 may be performed at the computing device 10 with low latency, whereas other processing tasks may be performed at the remote computing device 40 with higher latency but increased processing power. It will be appreciated that the connection between the computing device 10 and the remote computing device 40 is typically over a WAN.

In some examples, as shown in the example of FIG. 5, the processor 12 may be configured to identify the first subset 52 of the sensor data 50 and the second subset 54 of the sensor data 50 based at least in part on a communication latency 96 between the processor 12 and the remote computing device 40. For example, the processor 12 may be configured to compute a latency threshold 98 based on the sensor data 50 in real time as the sensor data is received. The latency threshold 98 may be determined at the first trained machine learning model 70. When the latency threshold 98 is below the communication latency between the processor 12 and the remote computing device 40, the processor 12 may be further configured to compute first control instructions 60 locally based on the sensor data 50. When the latency threshold 98 is above the communication latency 96, the processor 12 may be further configured to transmit at least a portion of the sensor data 50 to the remote computing device 40 for processing. Thus, the processor 12 may be configured to determine control instructions locally when the sensor data 50 indicates urgent conditions and to transmit sensor data 50 to the remote computing device 40 for processing when the sensor data 50 does not indicate urgent conditions. The first subset 52 and the second subset 54 may be identified based at least in part on the communication latency 96 in examples in which the remote machine learning model 74 is a version of the second trained machine learning model 72 with more model parameters.

Figure 6A:
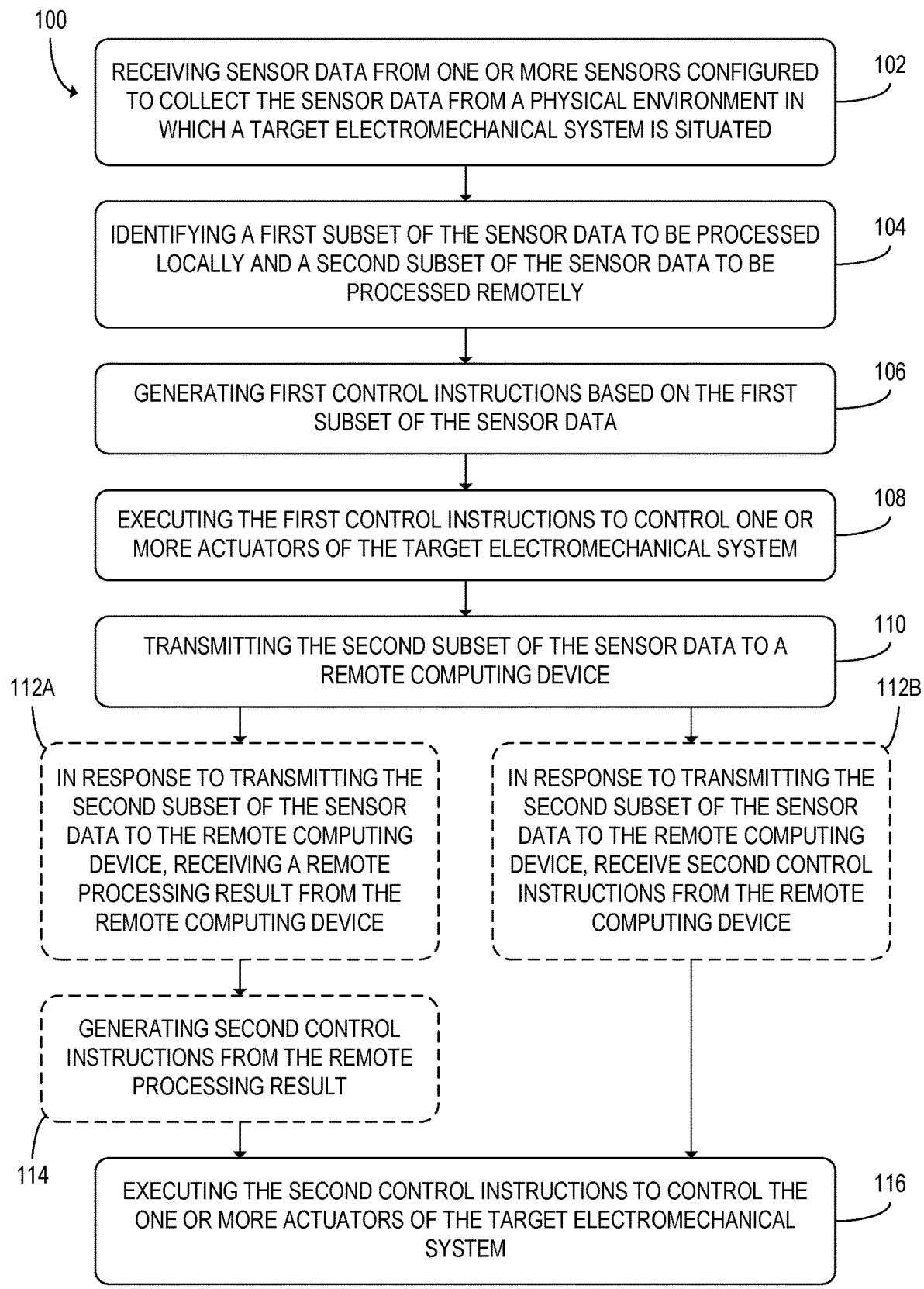
FIG. 6A shows a flowchart of a method for use with a computing device to control one or more actuators of a target electromechanical system, according to the embodiment of FIG. 1A.

FIG. 6A shows a flowchart of a method 100 for use with a computing device. The method 100 of FIG. 6A may be performed at the computing device 10 of FIG. 1A or at some other computing device. At step 102, the method 100 may include receiving sensor data from one or more sensors configured to collect the sensor data from a physical environment in which a target electromechanical system is situated. For example, the sensor data may be received from one or more cameras, one or more temperature sensors, one or more accelerometers, one or more pressure sensors, one or more microphones, one or more magnetic field sensors, or one or more other types of sensors. The computing device may be located in the physical environment in which the one or more sensors are provided and may receive the sensor data via a wired or wireless connection such as a LAN.

At step 104, the method 100 may further include identifying a first subset of the sensor data to be processed locally and a second subset of the sensor data to be processed remotely. The first subset and the second subset may be identified based on the values of the sensor data. Additionally, or alternatively, the first subset and the second subset may be identified based at least in part on one or more system conditions of the computing device, one or more task properties of processing tasks associated with the first subset and the second subset, or one or more performance criteria for the computing device or a remote computing device at which the second subset of the sensor data is configured to be processed.

Figure 6B:
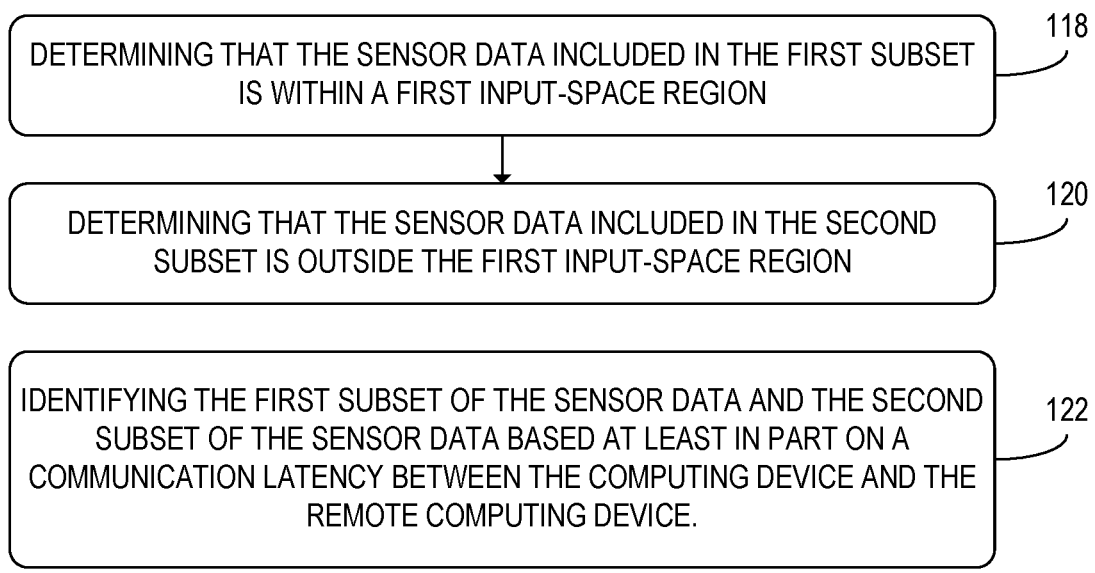
FIGS. 6B-6C show additional steps of the method of FIG. 6A that may be performed when the first subset of the sensor data to be processed locally and the second subset of the sensor data to be processed remotely are identified.

FIG. 6B shows additional steps of the method 100 that may be performed when performing step 104. At step 118, step 104 may include determining that the sensor data included in the first subset is within a first input-space region. In addition, at step 120, step 104 may further include determining that the sensor data included in the second subset is outside the first input-space region. The first input-space region may be a region of a parameter space formed by the one or more variables measured by the one or more sensors.

In some examples, at step 122, step 104 may include identifying the first subset of the sensor data and the second subset of the sensor data based at least in part on a communication latency between the computing device and the remote computing device. In such examples, the communication latency may be compared to a latency threshold that is dynamically computed in real time at the computing device and indicates how time-sensitive the sensor data is. The first subset may be a subset of the sensor data for which the latency threshold is below the communication latency (indicating that the sensor data has high time sensitivity), and the second subset may be a subset of the sensor data for which the latency threshold is above the communication latency (indicating that the sensor data has low time sensitivity).

Figure 6C:
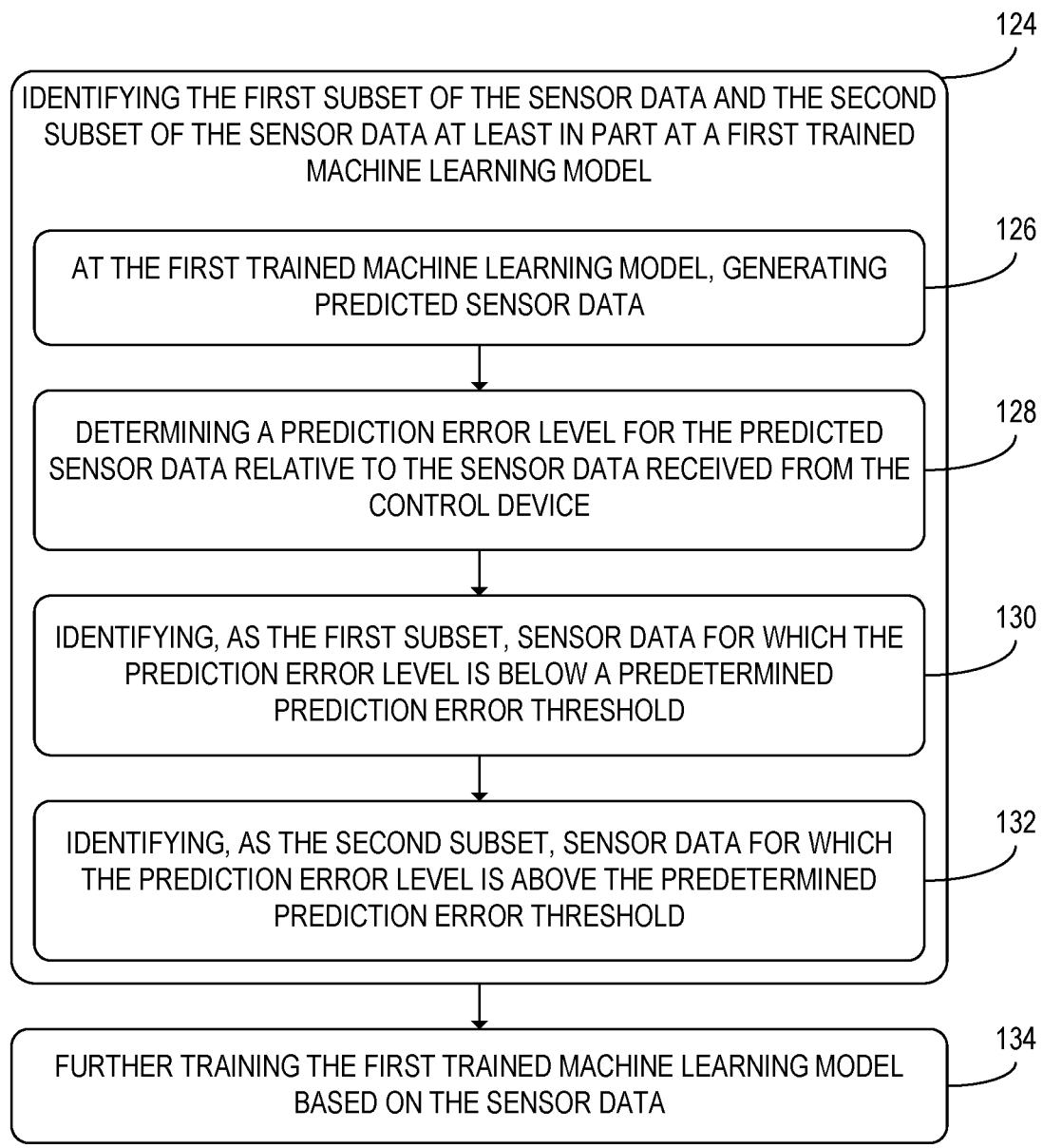

FIG. 6C also shows additional steps of the method 100 that may be performed when step 104 is performed. At step 124, the method 100 may include identifying the first subset of the sensor data and the second subset of the sensor data at least in part at a first trained machine learning model. The first trained machine learning model may, for example, be a recurrent neural network. The first trained machine learning model may take the sensor data as an input and may output respective classifications for the sensor data values as being included in the first subset or the second subset.

In some examples, at step 126, step 124 may include generating predicted sensor data at the first trained machine learning model. The predicted sensor data may be time series data. In addition, at step 128, step 124 may further include determining a prediction error level for the predicted sensor data relative to the sensor data received from the one or more sensors. Separate prediction error levels may, in some examples, be determined for individual variables of the sensor data or for one or more subsets of a plurality of variables included in the sensor data. In other examples, one prediction error level may be determined for the sensor data at a corresponding time value or time interval. At step 130, step 124 may further include identifying, as the first subset, sensor data for which the prediction error level is below a predetermined prediction error threshold. In addition, at step 132, step 124 may further include identifying, as the second subset, sensor data for which the prediction error level is above the predetermined prediction error threshold.

In some examples in which step 124 is performed, the method 100 may further include, at step 134, further training the first trained machine learning model based on the sensor data. For example, when the first machine learning model is a predictive processing model configured to generate predicted sensor data, the first machine learning model may be further trained via online learning as it receives sensor data, and may thereby increase the accuracy of the predicted sensor data it generates.

Returning to FIG. 6A, the method 100 may further include, at step 106, generating first control instructions based on the first subset of the sensor data. In some examples, the first control instructions may be generated at least in part at a second trained machine learning model. At step 108, the method 100 may further include executing the first control instructions to control one or more actuators of the target electromechanical system. Thus, instructions based on the first subset of the sensor data may be used to control the one or more actuators without incurring delays that would result from communicating with the remote computing device.

At step 110, the method 100 may further include transmitting the second subset of the sensor data to a remote computing device. The second subset may be transmitted to the remote computing device via a WAN. In some examples, the method 100 may further include, at step 112A, receiving a remote processing result from the remote computing device in response to transmitting the second subset of the sensor data to the remote computing device. In examples in which step 112A is performed, the method 100 may further include, at step 114, generating second control instructions from the remote processing result. In other examples, the method 100 may alternatively include, at step 112B, receiving the second control instructions from the remote computing device in response to transmitting the second subset of the sensor data to the remote computing device.

At step 116, the method 100 may further include executing the second control instructions to control the one or more actuators of the target electromechanical system. Thus, the remote processing result may be used to select actions performed at the one or more actuators.

Figure 6D:
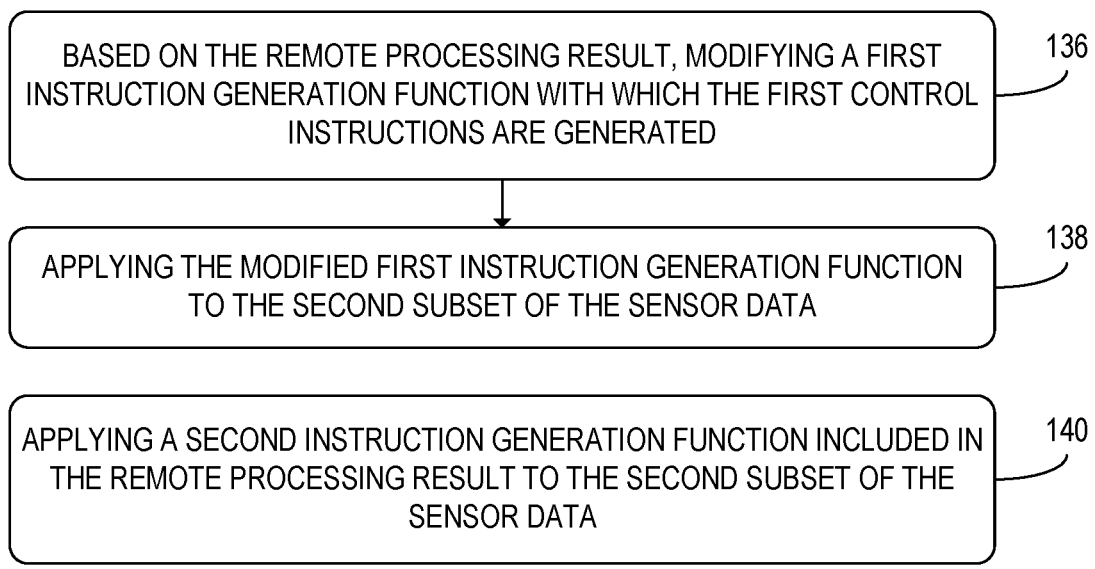
FIG. 6D shows additional steps of the method of FIG. 6A that may be performed when the second control instructions are generated.

FIG. 6D shows additional steps of the method 100 that may be performed in some examples when the second control instructions are generated at step 114. At step 136, generating the second control instructions at step 114 may further include, based on the remote processing result, modifying a first instruction generation function with which the first control instructions are generated. In examples in which step 136 is performed, the method 100 may further include, at step 138, applying the modified first instruction generation function to the second subset of the sensor data.

In some examples, the remote processing result may include a second instruction generation function. In such examples, step 114 may further include, at step 140, applying the second instruction generation function included in the remote processing result to the second subset of the sensor data.

In one example use case scenario, the computing device may be used in a sewage treatment plant. In such an example, the processor of the computing device may be configured to receive sensor data indicating a flow rate for effluent through a line with flow rate controlled by a valve. The computing device may be configured to transmit control instructions to an actuator that controls the valve, thereby functioning as part of a flow control system. The computing device may be programmable with a set point for the flow rate through the line, and may be configured to transmit control signals to adjust the valve opening to control the effluent to the flow rate. When the flow rate deviates from the set point by an amount greater than a corresponding threshold, the computing device may transmit sensor data to a remote computing device for further processing. For example, the sensor data transmitted to the remote computing device may include the flow rate and valve position during a time interval starting at a predetermined amount of time before the time value at which the threshold was exceeded. The remote computing device may input the sensor data it receives into a remote machine learning model, which may generate control instructions that are transmitted back to the computing device. The computing device may execute those control instructions to control the actuators included in the valves, and may thereby restore the flow rate to normal levels.

In another example, the computing device of the example above may be configured to execute a task distribution rule that executes locally a local flow rate control task for a particular flow rate in a particular line as controlled by a particular valve as the target electromechanical system, and that sends the flow rate and valve position information to the remote machine learning model locally to execute a global flow control task, such providing drainage to a city sewer system while not overloading a downstream outlet channel. To execute the global control task, the remote machine learning model receives as inputs the flow rates and valve positions of other lines within the system, as well as the level of the outlet channel. In this manner, local control tasks are performed locally at the computing device, and remote control tasks are performed under the direction of the remote computing device, which takes into account a wider variety of information sources.

In another example, the computing device may be configured to receive images from a camera imaging a manufacturing line as a sensor locally, generate a downscaled lower resolution of the image, and process the lower resolution version of the image using a convolutional neural network (CNN) to output a first control instruction to a robot performing a weld on a target workpiece in the image. The CNN may be trained to perform rough defect detection identify a defect in the workpiece based on the lower resolution image and stop the welding operation by the robot in real time during the operation. The computing device may be configured to send a higher resolution version of the image to the remote computing device for processing, and a convolutional neural network at the remote computing device may be configured to detect fine defects in the higher resolution version of the image, and send an instruction to computing device to take a remedial action. The remedial action may be to control the robot to perform a second weld to repair the defect, or if the workpiece has moved on in the assembly process, to instruct a downstream manufacturing conveyor to route the workpiece back for repair or discard the workpiece due to the fine defect.

Using the devices and methods discussed above, one or more actuators included in an IoT connected device may be controlled while avoiding communication delays that would otherwise occur when a PLC communicates with an edge computing device. Since such communication delays may be avoided, the computing device may be provided with additional computing capabilities, such as implementation of machine learning models, that would not be available on a PLC. The computing device may also offload processing of some of the sensor data it receives to a remote computing device. For example, the remote computing device and the computing device may have a "brain-spinal cord" relationship in which computing tasks with low computing power requirements and high time sensitivity are performed at the computing device whereas tasks with high computing power requirements and low time sensitivity are performed at the remote computing device. Thus, the computing device may quickly and efficiently control the IoT controlled device while also being able to respond appropriately to a wide variety of sensor inputs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
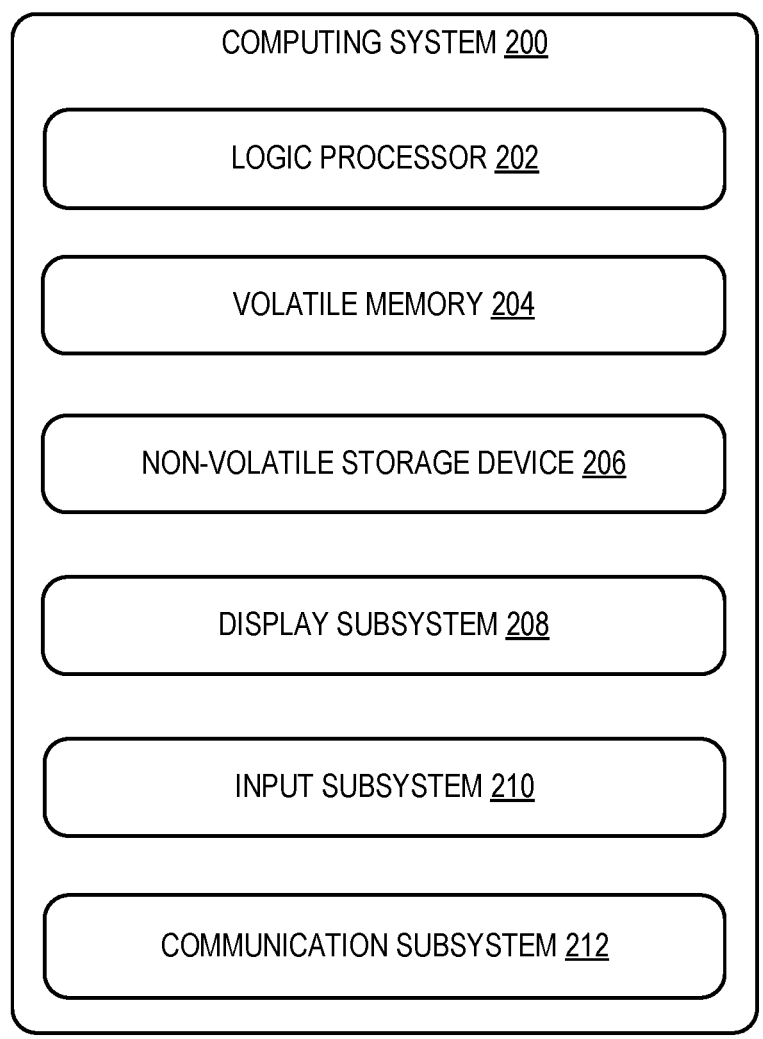
FIG. 7 shows a schematic view of an example computing environment in which the computing device of FIG. 1A may be enacted.

FIG. 7 schematically shows a non-limiting example of a computing system 200 that can enact one or more of the devices and methods described above. Computing system 200 is shown in simplified form. Computing system 200 may embody the computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network. In some examples, the communication subsystem may allow computing system 200 to send and/or receive messages to and/or from other devices via a network such as the Internet.

The following paragraphs discuss several aspects of the present disclosure. According to one aspect of the present disclosure, a computing device is provided, including a processor configured to receive sensor data from one or more sensors configured to collect the sensor data from a physical environment in which a target electromechanical system is situated. The processor may be further configured to identify a first subset of the sensor data to be processed locally and a second subset of the sensor data to be processed remotely. The processor may be further configured to generate first control instructions based on the first subset of the sensor data. The processor may be further configured to execute the first control instructions to control one or more actuators of the target electromechanical system. The processor may be further configured to transmit the second subset of the sensor data to a remote computing device, and, in response to transmitting the second subset of the sensor data to the remote computing device, receive a remote processing result from the remote computing device. The processor may be further configured to generate second control instructions from the remote processing result. The processor may be further configured to execute the second control instructions to control the one or more actuators of the target electromechanical system.

According to this aspect, the processor may be configured to identify the first subset of the sensor data at least in part by determining that the sensor data included in the first subset is within a first input-space region. The processor may be further configured to identify the second subset of the sensor data at least in part by determining that the sensor data included in the second subset is outside the first input-space region.

According to this aspect, the remote processing result may include an indication of a second input-space region within which the sensor data included in the second subset is located. The remote processing result may further include a second instruction generation function that maps one or more sensor data values located within the second input-space region to one or more respective control instructions. The processor may be further configured to generate the second control instructions at least in part by applying the second instruction generation function to the second subset of the sensor data.

According to this aspect, the remote processing result may include a modification to a first instruction generation function with which the processor is configured to generate the first control instructions.

According to this aspect, the processor may be configured to identify the first subset of the sensor data and the second subset of the sensor data at least in part at a first trained machine learning model.

According to this aspect, the processor may be further configured to, at the first trained machine learning model, generate predicted sensor data. The processor may be further configured to determine a prediction error level for the predicted sensor data relative to the sensor data received from the one or more sensors. The processor may be further configured to identify, as the first subset, sensor data for which the prediction error level is below a predetermined prediction error threshold. The processor may be further configured to identify, as the second subset, sensor data for which the prediction error level is above the predetermined prediction error threshold.

According to this aspect, the processor may be further configured to further train the first trained machine learning model based on the sensor data.

According to this aspect, the processor may be configured to generate the first control instructions at least in part at a second trained machine learning model.

According to this aspect, the processor may be configured to generate the first control instructions based on the first subset of the sensor data in real time as the first subset is received. The processor may be further configured to transmit the second subset of the sensor data to the remote computing device for non-real-time processing.

According to this aspect, the processor may be configured to identify the first subset of the sensor data and the second subset of the sensor data based at least in part on a communication latency between the processor and the remote computing device.

According to this aspect, the processor may be configured to receive the sensor data via a local connection selected from the group consisting of a serial connection, a fieldbus, and a local area network. The processor may be configured to transmit the second subset of the sensor data to the remote computing device via a wide area network (WAN).

According to another aspect of the present disclosure, a method for use with a computing device is provided. The method may include receiving sensor data from one or more sensors configured to collect the sensor data from a physical environment in which a target electromechanical system is situated. The method may further include identifying a first subset of the sensor data to be processed locally and a second subset of the sensor data to be processed remotely. The method may further include generating first control instructions based on the first subset of the sensor data. The method may further include executing the first control instructions to control one or more actuators of the target electromechanical system. The method may further include transmitting the second subset of the sensor data to a remote computing device, and, in response to transmitting the second subset of the sensor data to the remote computing device, receiving a remote processing result from the remote computing device. The method may further include generating second control instructions from the remote processing result. The method may further include executing the second control instructions to control the one or more actuators of the target electromechanical system.

According to this aspect, identifying the first subset of the sensor data may include determining that the sensor data included in the first subset is within a first input-space region. Identifying the second subset of the sensor data may include determining that the sensor data included in the second subset is outside the first input-space region.

According to this aspect, generating the second control instructions may include, based on the remote processing result, modifying a first instruction generation function with which the first control instructions are generated. Generating the second control instructions may further include, applying the modified first instruction generation function to the second subset of the sensor data.

According to this aspect, the method may further include identifying the first subset of the sensor data and the second subset of the sensor data at least in part at a first trained machine learning model.

According to this aspect, the method may further include, at the first trained machine learning model, generating predicted sensor data. The method may further include determining a prediction error level for the predicted sensor data relative to the sensor data received from the one or more sensors. The method may further include identifying, as the first subset, sensor data for which the prediction error level is below a predetermined prediction error threshold. The method may further include identifying, as the second subset, sensor data for which the prediction error level is above the predetermined prediction error threshold.

According to this aspect, the first control instructions may be generated at least in part at a second trained machine learning model.

According to this aspect, the first control instructions may be generated in real time based on the first subset of the sensor data as the first subset of sensor data is received. The second subset of the sensor data may be transmitted to the remote computing device for non-real-time processing.

According to this aspect, the method may further include identifying the first subset of the sensor data and the second subset of the sensor data based at least in part on a communication latency between the computing device and the remote computing device.

According to another aspect of the present disclosure, a computing device is provided, including a processor configured to receive sensor data from one or more sensors configured to collect the sensor data from a physical environment in which a target electromechanical system is situated. The processor may be further configured to identify a first subset of the sensor data to be processed locally and a second subset of the sensor data to be processed remotely. The processor may be further configured to generate first control instructions based on the first subset of the sensor data. The processor may be further configured to execute the first control instructions to control one or more actuators of the target electromechanical system. The processor may be further configured to transmit the second subset of the sensor data to a remote computing device, and, in response to transmitting the second subset of the sensor data to the remote computing device, receive second control instructions from the remote computing device. The processor may be further configured to execute the second control instructions to control the one or more actuators of the target electromechanical system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
receive sensor data from one or more sensors configured to collect the sensor data from a physical environment in which a target electromechanical system is situated;
identify a first subset of the sensor data to be processed locally and a second subset of the sensor data to be processed remotely;
generate first control instructions based on the first subset of the sensor data;
execute the first control instructions to control one or more actuators of the target electromechanical system;
transmit the second subset of the sensor data to a remote computing device;
in response to transmitting the second subset of the sensor data to the remote computing device, receive a remote processing result from the remote computing device;
generate second control instructions from the remote processing result; and
execute the second control instructions to control the one or more actuators of the target electromechanical system.

2. The computing device of claim 1, wherein the processor is configured to:
identify the first subset of the sensor data at least in part by determining that the sensor data included in the first subset is within a first input-space region; and
identify the second subset of the sensor data at least in part by determining that the sensor data included in the second subset is outside the first input-space region.

3. The computing device of claim 2, wherein:
the remote processing result includes:
an indication of a second input-space region within which the sensor data included in the second subset is located; and
a second instruction generation function that maps one or more sensor data values located within the second input-space region to one or more respective control instructions; and
the processor is further configured to generate the second control instructions at least in part by applying the second instruction generation function to the second subset of the sensor data.

4. The computing device of claim 1, wherein the remote processing result includes a modification to a first instruction generation function with which the processor is configured to generate the first control instructions.

5. The computing device of claim 1, wherein the processor is configured to identify the first subset of the sensor data and the second subset of the sensor data at least in part at a first trained machine learning model.

6. The computing device of claim 5, wherein the processor is further configured to:
at the first trained machine learning model, generate predicted sensor data;
determine a prediction error level for the predicted sensor data relative to the sensor data received from the one or more sensors;
identify, as the first subset, sensor data for which the prediction error level is below a predetermined prediction error threshold; and
identify, as the second subset, sensor data for which the prediction error level is above the predetermined prediction error threshold.

7. The computing device of claim 5, wherein the processor is further configured to further train the first trained machine learning model based on the sensor data.

8. The computing device of claim 1, wherein the processor is configured to generate the first control instructions at least in part at a second trained machine learning model.

9. The computing device of claim 1, wherein the processor is configured to:
generate the first control instructions based on the first subset of the sensor data in real time as the first subset is received; and
transmit the second subset of the sensor data to the remote computing device for non-real-time processing.

10. The computing device of claim 1, wherein the processor is configured to identify the first subset of the sensor data and the second subset of the sensor data based at least in part on a communication latency between the processor and the remote computing device.

11. The computing device of claim 1, wherein:
the processor is configured to receive the sensor data via a local connection selected from the group consisting of a serial connection, a fieldbus, and a local area network; and
the processor is configured to transmit the second subset of the sensor data to the remote computing device via a wide area network (WAN).

12. A method for use with a computing device, the method comprising:
receiving sensor data from one or more sensors configured to collect the sensor data from a physical environment in which a target electromechanical system is situated;
identifying a first subset of the sensor data to be processed locally and a second subset of the sensor data to be processed remotely;

generating first control instructions based on the first subset of the sensor data;

executing the first control instructions to control one or more actuators of the target electromechanical system;

transmitting the second subset of the sensor data to a remote computing device;

in response to transmitting the second subset of the sensor data to the remote computing device, receiving a remote processing result from the remote computing device;

generating second control instructions from the remote processing result; and executing the second control instructions to control the one or more actuators of the target electromechanical system.

13. The method of claim 12, wherein:

identifying the first subset of the sensor data includes determining that the sensor data included in the first subset is within a first input-space region; and identifying the second subset of the sensor data includes determining that the sensor data included in the second subset is outside the first input-space region.

14. The method of claim 12, wherein generating the second control instructions includes:

based on the remote processing result, modifying a first instruction generation function with which the first control instructions are generated; and applying the modified first instruction generation function to the second subset of the sensor data.

15. The method of claim 12, further comprising identifying the first subset of the sensor data and the second subset of the sensor data at least in part at a first trained machine learning model.

16. The method of claim 15, further comprising:

at the first trained machine learning model, generating predicted sensor data;

determining a prediction error level for the predicted sensor data relative to the sensor data received from the one or more sensors;

identifying, as the first subset, sensor data for which the prediction error level is below a predetermined prediction error threshold; and identifying, as the second subset, sensor data for which the prediction error level is above the predetermined prediction error threshold.

17. The method of claim 12, wherein the first control instructions are generated at least in part at a second trained machine learning model.

18. The method of claim 12, wherein:

the first control instructions are generated in real time based on the first subset of the sensor data as the first subset of sensor data is received; and the second subset of the sensor data are transmitted to the remote computing device for non-real-time processing.

19. The method of claim 12, further comprising identifying the first subset of the sensor data and the second subset of the sensor data based at least in part on a communication latency between the computing device and the remote computing device.

20. A computing device comprising:

a processor configured to:

receive sensor data from one or more sensors configured to collect the sensor data from a physical environment in which a target electromechanical system is situated;

identify a first subset of the sensor data to be processed locally and a second subset of the sensor data to be processed remotely;

generate first control instructions based on the first subset of the sensor data;

execute the first control instructions to control one or more actuators of the target electromechanical system;

transmit the second subset of the sensor data to a remote computing device;

in response to transmitting the second subset of the sensor data to the remote computing device, receive second control instructions from the remote computing device; and execute the second control instructions to control the one or more actuators of the target electromechanical system.

* * * * *